United States Patent
Shen et al.

(10) Patent No.: US 8,787,406 B2
(45) Date of Patent: Jul. 22, 2014

(54) METHOD AND APPARATUS FOR DISTRIBUTING AND RECEIVING HIGH-SPEED ETHERNET MEDIA INDEPENDENT INTERFACE BLOCKS

(75) Inventors: Yao Shen, Shenzhen (CN); Li Zeng, Shenzhen (CN); Chiwu Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 12/498,935

(22) Filed: Jul. 7, 2009

(65) Prior Publication Data

US 2009/0274172 A1     Nov. 5, 2009

Related U.S. Application Data

(63) Continuation of application No. PCT/CN2008/000963, filed on May 19, 2008.

(30) Foreign Application Priority Data

May 18, 2007   (CN) .......................... 2007 1 0107094

(51) Int. Cl.
*H04L 1/00* (2006.01)

(52) U.S. Cl.
CPC .................................. *H04L 1/0057* (2013.01)
USPC ..................................................... 370/472

(58) Field of Classification Search
CPC . H04L 1/0057; H04L 1/0083; H04L 25/4908; H04L 25/0284; H04L 25/03866; H04L 12/66; H04J 3/1611; H04J 3/076; G06F 13/385; G06F 3/147

USPC ........................................................ 370/472
See application file for complete search history.

(56) References Cited

U.S. PATENT DOCUMENTS

| 6,275,501 | B1 | 8/2001 | Lucas et al. |
| 7,729,389 | B1 * | 6/2010 | Lo .................................. 370/535 |
| 2002/0083190 | A1 * | 6/2002 | Kamiya et al. ................. 709/236 |

(Continued)

FOREIGN PATENT DOCUMENTS

CN     1581837 A     2/2005

OTHER PUBLICATIONS

Extended European Search Report in counterpart European Application No. 08748514.0-1249, mailed Dec. 23, 2009.

(Continued)

*Primary Examiner* — Jason Mattis
*Assistant Examiner* — Stephen J Clawson
(74) *Attorney, Agent, or Firm* — Leydig, Voit & Mayer, Ltd.

(57) ABSTRACT

A method and apparatus for distributing and receiving high-speed Ethernet Media Independent Interface (MII) blocks are provided to moderate the increase of control lines with the increase of the bit width and to simplify the block types in the coding process of the Physical Coding Sublayer (PCS). The technical solution disclosed herein includes: processing received Media Access Control (MAC) layer data, and adjusting distribution of control characters to generate a 64-bit block; obtaining a control signal code of the 64-bit block according to the relation between the form of the 64-bit block and the control signal code; and binding each 64-bit block to the corresponding control signal code respectively, and sending bound data over a separate channel.

7 Claims, 7 Drawing Sheets

(56) References Cited

U.S. PATENT DOCUMENTS

| | | | | |
|---|---|---|---|---|
| 2003/0084195 | A1 | 5/2003 | Dove | |
| 2004/0202198 | A1* | 10/2004 | Walker et al. | 370/474 |
| 2005/0013317 | A1* | 1/2005 | Lindsay et al. | 370/462 |
| 2005/0047433 | A1* | 3/2005 | Rizer et al. | 370/464 |
| 2007/0103344 | A1* | 5/2007 | Baumer | 341/50 |

OTHER PUBLICATIONS

Written Opinion in counterpart PCT Application No. PCT/CN2008/000963, mailed Jul. 24, 2008.

"Series G: Transmission Systems and Media, Digital Systems and Networks—Data over Transport—Generic aspects—General / Series Y: Global Information Infrastructure, Internet Protocol Aspects and Next-Generation Networks—Internet protocol aspects—Transport," *International Telecommunication Union*, ITU-T Recommendation No. G.7041/Y.1303 (Aug. 2005).

"Draft Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation," *IEEE Computer Society*, Standard No. P802.3ae, D5.0, May 2002.

"IEEE Standard for Information technology—Telecommunications and information exchange between systems—Local and metropolitan area networks—Specific requirements—Part 3: Carrier sense multiple access with collision detection (CSMA/CD) access method and physical layer specifications," *IEEE Computer Society*, IEEE Standard No. 802.3-2002 (Revision of IEEE Standard No. 802.3, 2000 Edition), Mar. 8, 2002.

International Search Report in corresponding PCT Application No. PCT/CN2008/000963 (Jul. 24, 2008).

1st Office Action in corresponding Chinese Application No. 200710107094.2 (Aug. 25, 2011).

$2^{nd}$ Office Action in corresponding Chinese Patent Application No. 200710107094.2 (Jun. 25, 2012).

* cited by examiner

METHOD AND APPARATUS FOR DISTRIBUTING AND RECEIVING HIGH-SPEED ETHERNET MEDIA INDEPENDENT INTERFACE BLOCKS

CROSS-REFERENCE TO RELATED APPLICATIONS

This application is a continuation of International Application No. PCT/CN2008/000963, filed on May 19, 2008, which claims the benefit of Chinese Patent Application No. 200710107094.2, filed on May 18, 2007, both of which are hereby incorporated by reference in their entireties.

FIELD OF THE INVENTION

The present invention relates to the computer and network field, and in particular, to a method and apparatus for distributing and receiving high-speed Ethernet Media Independent Interface (MII) blocks.

BACKGROUND OF THE INVENTION

According to the Open Systems Interconnection (OSI) reference model defined by the ISO/IEC, the Ethernet Data Link Layer (DL) and the Physical Layer (PHY) are connected through an x MII. A 10M/100M Ethernet interface is an MII, 1000M and higher-speed Ethernet interfaces are Gigabit Media Independent Interfaces (GMIIs), and a 10 GE interface is a 10 Gigabit Media Independent Interface (XGMII).

Besides, the Media Access Control (MAC) layer data is transmitted per byte (8 bits) through an MII bus. Transcoding is performed per byte at the Physical Coding Sublayer (PCS) of the physical layer.

With the progress of time and technologies, the Ethernet develops toward the 100 G rate. Currently, the 100 GE is being standardized. The work of the IEEE HSSG is to: specify the requirements of the High Speed Ethernet (HSE) of 10 G or higher rates, research the market potentiality, technical maturity and economic maturity, determine subsequent standard projects and project objectives, and prescribe the subsequent technical solution research and solution standardization. The 100 GE standardization process needs to be supported by the definition of the 100 Gigabit Media Independent Interface (CGMII) interface.

If the 100 GE continues using the multi-channel byte distribution mode, the order of distributing the byte needs to be maintained in the multi-channel forwarding process so that the subsequent 64B/66B coding of channels is ensured. Moreover, every 8 bits carry a 1-bit control identifier. The increase of data bit width leads to a sharp increase of the control identifier bits. Therefore, if the 100 GE uses the multi-channel byte distribution mode, the signal bit width is small and the distribution unit is small and cannot support data distribution of high-speed interfaces.

The XGMII uses the multi-channel byte distribution mode, namely, uses four channels. One channel distributes 8-bit data signals and 1-bit control signals, thus increasing the bit width of the XGMII interface to 32 bits (4 bytes). The control signal indication mode of MII and GMII is not applicable to the multi-channel control indication. Therefore, control characters are introduced into the XGMII interface. The control signal validity and the control character code jointly indicate the control information and data information: An invalid control signal indicates that the information is data information; and a valid control signal and a control character code jointly indicate the control information on the channel.

However, the 8-bit data character represents control character information when the control line is valid, but the 1-bit control line (TXC) may still only indicate whether the 8 bits are a data character or a control character. Based on the related art, the number of the control lines increases sharply with the increase of the bit width, and the block types are more and more complicated while the PCS performs coding.

In the process of developing the present invention, the inventor finds that in the prior data distribution technology of high-speed interfaces, the number of the control lines increases sharply with the increase of the bit width, and the block types are more and more complicated while the PCS performs coding.

SUMMARY OF THE INVENTION

A method and apparatus for distributing and receiving high-speed Ethernet MII blocks are provided in embodiments of the present invention to moderate the increase of control lines with the increase of the bit width and to simplify the block types in the coding process of the PCS.

A method for distributing high-speed Ethernet MII blocks is provided in an embodiment of the present invention. The method includes: processing received MAC layer data, and adjusting distribution of control characters to generate a 64-bit block; obtaining a control signal code of the 64-bit block according to the relation between the form of the 64-bit block and the control signal code; and binding each 64-bit block to the corresponding control signal code respectively, and sending the bound data over a separate channel.

A method for receiving high-speed Ethernet MII blocks is provided in an embodiment of the present invention. The method includes: resolving a control signal according to the relation between a preset form of a 64-bit block and a control signal code after receiving the 64-bit block and the corresponding control signal; restoring MAC frame data out of the 64-bit block corresponding to the control signal according to the resolution result; and splicing the restored MAC frame data into a complete MAC frame in the order of receiving the 64-bit block, and removing an Inter-Packet Gap (IPG) in the data.

An apparatus for distributing high-speed Ethernet MII blocks is provided in an embodiment of the present invention. The apparatus includes: a block unit, configured to process received MAC layer data and adjust distribution of control characters to generate a 64-bit block; a control signal generating unit, configured to obtain the control signal code of the 64-bit block generated by the block unit according to the relation between the form of the 64-bit block and the control signal code; and a channel distributing unit, configured to: read the 64-bit block in the block unit, read the control signal code in the control signal generating unit, bind the 64-bit block to the corresponding control signal code, and send the bound data over a separate channel.

An apparatus for receiving high-speed Ethernet MII blocks is provided in an embodiment of the present invention. The apparatus includes: a channel receiving unit, configured to send a received 64-bit block and a corresponding control signal respectively in the receiving order; a control signal resolving unit, configured to: receive the control signal from the channel receiving unit, resolve the received control signal according to the relation between the preset form of the 64-bit block and the control signal code, and output a resolution result; and a block resolving unit, configured to: receive the 64-bit block from the channel receiving unit, receive the resolution result from the control signal resolving unit, restore MAC frame data out of the 64-bit block corresponding to the control signal according to the received resolution result, and splice the restored MAC frame data into a complete MAC frame in the order of receiving the 64-bit block, and remove an IPG in the data.

In the embodiments of the present invention, the blocks are distributed per 64 bits. This distribution mode increases the bit width, compresses the control information effectively, and reduces the control lines of the interface and the width occupied by the out-band control information. The distribution of the control characters is adjusted according to the preset form of the 64-bit block, and no more block forms are introduced. Therefore, the block types are simple in the PCS coding, and the PCS coding is simplified.

DETAILED DESCRIPTION OF THE EMBODIMENTS

If the high-speed Ethernet distributes data according to the prior multi-channel byte distribution mode, the block types are more diversified and complicated as a result of byte distribution when the PCS performs 64B/66B coding. Moreover, one byte carries a 1-bit control signal, and more control identifier lines need to be added for interfaces with high bit width, and the out-band control information occupies a large quantity of transmission bandwidth and resources. Stricter requirements are imposed on the chip pins, and more parallel cables are required for transmission on the interfaces with high bit width.

Figure 1:
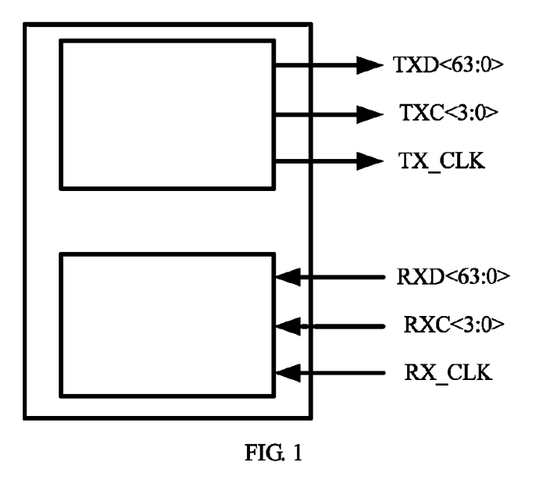
FIG. 1 shows interface signals in an embodiment of the present invention.

Therefore, the embodiments of the present invention propose a method for distributing data per 64 bits, namely, every 64 bits are a distribution unit or block, and use 4-bit control lines (in practice, N-bit control lines may be used instead, where N is a natural number) to indicate the 64-bit block type and the corresponding control information or data information. As shown in FIG. 1, the interface signals include:
  64-bit data transmitting signal (TXD<63:0>);
  4-bit transmitting control signal (TXC<3:0>);
  transmitting clock signal (TX_CLK);
  64-bit data receiving signal (RXD<63:0>);
  4-bit receiving control signal (RXC<3:0>>); and
  receiving clock signal (RX_CLK).

The following control characters are defined herein:
  1. Start Control Character.
  The Start control character indicates the start of a frame, and derives from the first octet of the MAC frame data pre-amble. The Start control character is located only in the first byte (lower 8 bits) of a 64-bit block. The Start Frame Delimiter (SFD) is the eighth byte (higher 8 bits) of the same 64-bit block. That is, the Start control character and the SDF are located in the same 64-bit block. To achieve the foregoing objectives, the RS sublayer needs to modify the length of the IPG at the time of sending data to ensure distribution of the Start control character.

The foregoing function may be performed in two modes:

Mode 1: The MAC layer combines the function of the RS layer into the design of the MAC layer, and an extra Idle character is always inserted to make every preamble start from the border of the eight bytes.

Mode 2: The RS layer makes the Start control character located in the first octet of a channel by inserting or deleting the Idle character at the proper time, and maintains a valid data rate.

2. Terminate Control Character
  The Terminate control character indicates the end of a frame, and is located in the byte next to the valid data of the MAC frame.

3. Error Control Character
  The Error control character indicates the error generated in the sending process so that the peer MAC layer can better detect the error.

4. Sequence Control Character
  The Sequence control character indicates the link failure information. The link failure information appears only in the IPG The Sequence control character and the ordered_set jointly indicate the link failure state. The Sequence control character is distributed in the first byte (lower 8 bits) of a 64-bit block.

5. Idle Control Character
  The Idle control character appears in the IPG By adding or deleting an Idle control character, the distribution of the Sequence control character and the Start control character may be adjusted. If no MAC frame data is sent, the Idle control character is sent to the PHY.

Embodiment 1

Figure 2:
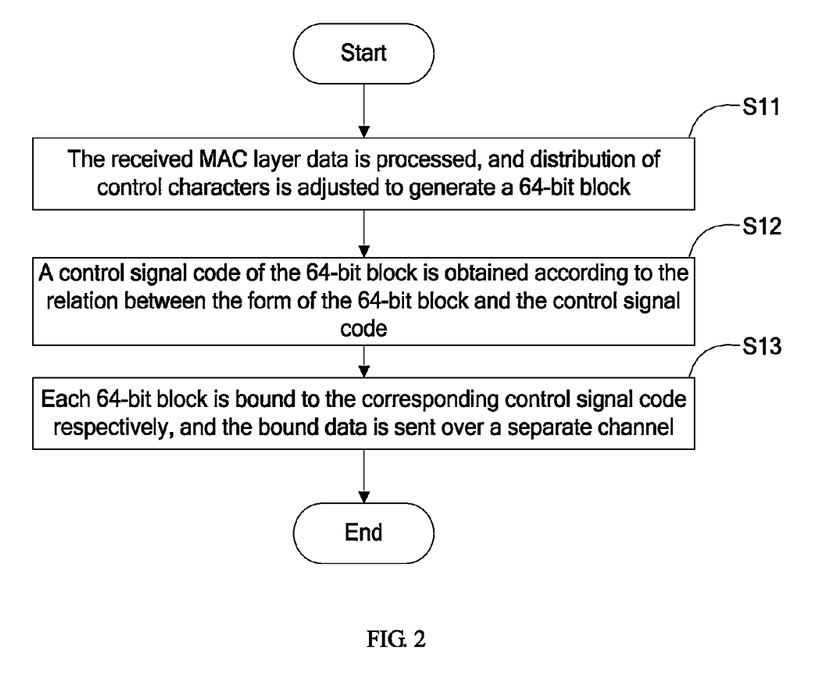
FIG. 2 is a flowchart of a method in a first embodiment of the present invention.

A method for distributing high-speed Ethernet MII blocks is provided. As shown in FIG. 2, the method includes the following steps:

S11. The received MAC layer data (composed of MAC frame data and an IPG) is processed, and the distribution of control characters is adjusted to generate a 64-bit block.

This step includes: inserting the Idle control character to fill the IPG between different MAC frames; and then replacing the control character at the frame header and the frame trailer; finally, adjusting the distribution of the control character by adding or deleting the Idle control character according to the preset form of the 64-bit block.

Table 1 shows the preset form of the 64-bit block and the relation between the form and the control signal code, namely, each form of the 64-bit block corresponds to a control signal code:

TABLE 1

| DATA[63:0] | | | | | | | | CTRL[3:0] |
|---|---|---|---|---|---|---|---|---|
| D | D | D | D | D | D | D | D | 0000 |
| S | D | D | D | D | D | D | D | 1000 |
| O | D | D | D | C | C | C | C | 1100 |
| E | T | C | C | C | C | C | C | 1110 |
| C | C | C | C | C | C | C | C | 1010 |

TABLE 1-continued

| DATA[63:0] | | | | | | | | CTRL[3:0] |
|---|---|---|---|---|---|---|---|---|
| T | C | C | C | C | C | C | C | 1111 |
| D | T | C | C | C | C | C | C | 0111 |
| D | D | T | C | C | C | C | C | 0110 |
| D | D | D | T | C | C | C | C | 0101 |
| D | D | D | D | T | C | C | C | 0100 |
| D | D | D | D | D | T | C | C | 0011 |
| D | D | D | D | D | D | T | C | 0010 |
| D | D | D | D | D | D | D | T | 0001 |

In Table 1 (control characters and XGMII interface control characters)
D: data byte;
S: Start control character;
O: Sequence control character;
T: Terminate control character;
E: Error control character; and
C: Other control characters except Start, Terminate, and Sequence.

Table 2 shows another type of preset form of the 64-bit block and the relation between the form and the control signal code, namely, a control signal code corresponds to an instance of an octet position occupied by the first control character in a 64-bit block:

TABLE 2

| DATA[63:0] | | | | | | | | CTRL[3:0] |
|---|---|---|---|---|---|---|---|---|
| D | D | D | D | D | D | D | D | 0000 |
| S | D | D | D | D | D | D | D | 1000 |
| O | D | D | D | C | C | C | C | |
| E | T | C | C | C | C | C | C | |
| C | C | C | C | C | C | C | C | |
| T | C | C | C | C | C | C | C | |
| D | T | C | C | C | C | C | C | 0111 |
| D | D | T | C | C | C | C | C | 0110 |
| D | D | D | T | C | C | C | C | 0101 |
| D | D | D | D | T | C | C | C | 0100 |
| D | D | D | D | D | T | C | C | 0011 |
| D | D | D | D | D | D | T | C | 0010 |
| D | D | D | D | D | D | D | T | 0001 |

S12. A control signal code of the 64-bit block is obtained according to the relation between the form of the 64-bit block and the control signal code.

S13. Each 64-bit block is bound to the corresponding control signal code respectively, and the bound data is sent over a separate channel.

In this step, the 64-bit block and the corresponding control signal code may be distributed at the same clock tick for the purpose of binding them; and the 64-bit block and the control signal code which are bound together are distributed on the same channel.

Embodiment 2

Figure 3:
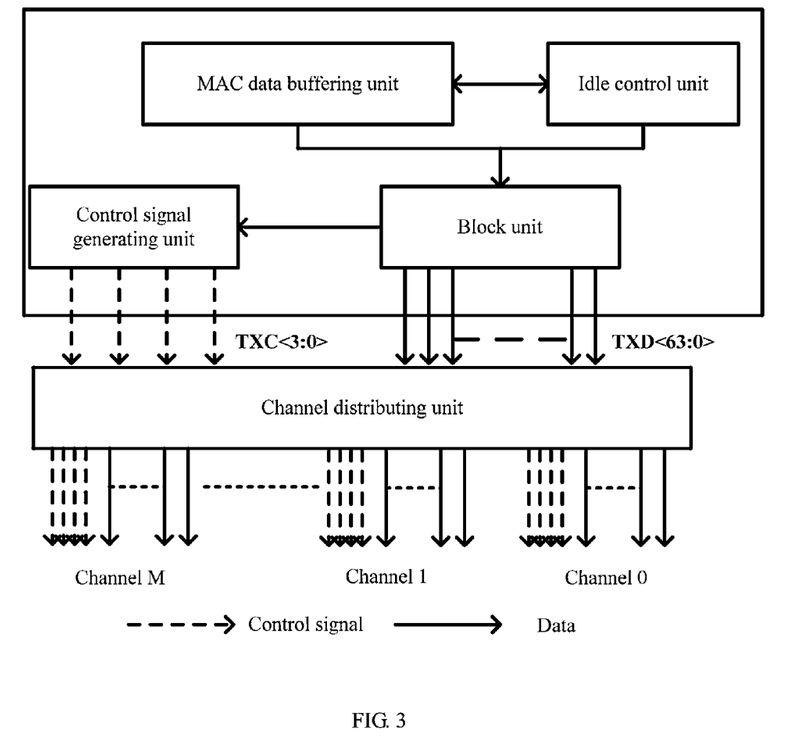
FIG. 3 shows a structure of an apparatus in a second embodiment of the present invention.

An apparatus for distributing high-speed Ethernet MII blocks is provided. As shown in FIG. 3, the apparatus includes: a block unit, a control signal generating unit, and a channel distributing unit, and further includes a MAC data buffering unit and an Idle control unit.

The MAC data buffering unit is configured to buffer MAC frame data, for example, in First In First Out (FIFO) mode, and output the MAC frame data to the block unit.

The Idle control unit is configured to generate an Idle control character and output the Idle control character to the block unit.

The block unit is configured to process received MAC layer data and adjust distribution of control characters to generate a 64-bit block. The MAC layer data includes: MAC frame data sent by the MAC data buffering unit, and the Idle control character sent by the Idle control unit.

The control signal generating unit is configured to obtain the control signal code of the 64-bit block generated by the block unit according to the relation between the form of the 64-bit block and the control signal code.

The channel distributing unit is configured to: read the 64-bit block in the block unit, read the control signal code in the control signal generating unit, bind the 64-bit block to the corresponding control signal code, and send the bound data over a separate channel. Especially, the 64-bit block and the corresponding control signal code may be distributed at the same clock tick for the purpose of binding them; and the 64-bit block and the control signal code which are bound together are distributed on the same channel.

Embodiment 3

A modularized flow is described with reference to embodiment 1 and embodiment 2.

1. MAC frame data is buffered in the MAC data buffering unit, and the Idle control unit exercises control to generate an Idle control character. Normally, the block unit reads the MAC frame data buffered in the MAC data buffering unit. When the block unit determines that the received MAC frame data is invalid, the Idle control unit writes an Idle control character into the block unit to fill the IPG between different MAC frames.

2. The block unit receives the MAC frame data and the IPG filler character "Idle", and replaces the control character for the frame header and frame trailer of the MAC frame data. When the distribution of the control character needs to be adjusted, the block unit adds or deletes an Idle control character for the buffered MAC layer data (including the MAC frame data and IPG filler character "Idle"), and ensures that the form of the generated 64-bit block complies with the 64-bit code information (as shown in Table 1 and Table 2). The generated 64-bit block is stored in the block unit FIFO.

Figure 4:
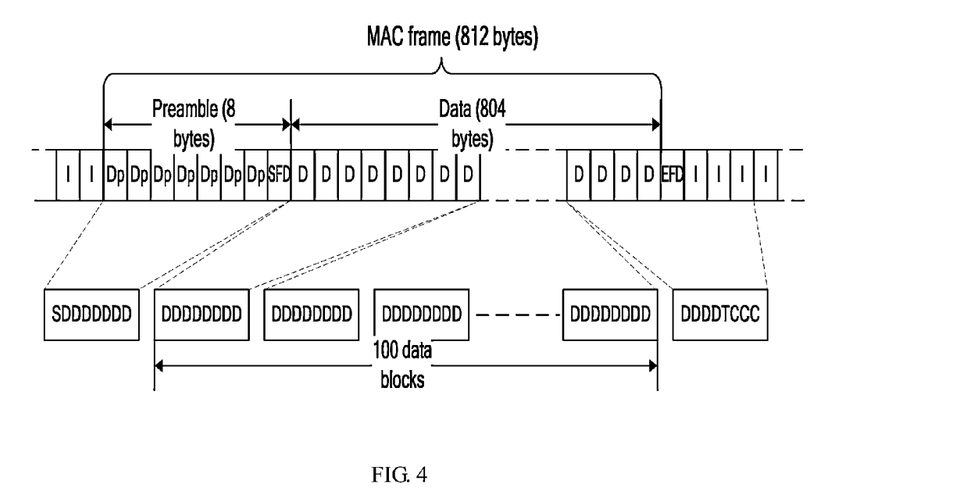
FIG. 4 shows a data structure of a MAC layer in a third embodiment of the present invention.

For example, an 812-byte MAC layer data frame is received, and the MAC layer data structure is shown in FIG. 4:

The first byte of the preamble is replaced with a Start control character; the next byte of the frame trailer is replaced with a Terminate control character; and an Idle control character is written to fill the IPG. Through addition or deletion of the Idle control character, the MAC layer data preamble forms a 64-bit block.

Note: In FIG. 4, a pane represents a byte; I represents IPG; Dp represents the MAC layer data preamble; D represents data; SFD represents Start Frame Delimiter; and EFD represents End Frame Delimiter.

Figure 5:
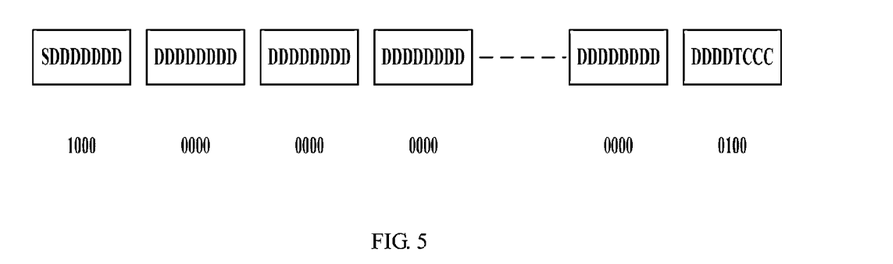
FIG. 5 shows generated control signal codes corresponding to 64-bit blocks in the third embodiment of the present invention.

3. The control signal generating unit performs control signal coding for every 64-bit block stored in the block unit FIFO according to the relation between the form of the 64-bit block and the control signal code (the control signal is composed of N bits, for example, 4 bits in this embodiment), and stores the generated control signal code into the register of the control signal generating unit. FIG. 5 shows the generated control signal code corresponding to each 64-bit block.

4. Through a clock, the channel distributing unit synchronously reads the 64-bit block in the block unit FIFO and reads the control signal code which is stored in the register of the control signal generating unit and corresponds to the 64-bit block, and sends the interface data to the interface bus after generating complete interface data. That is, the 64-bit block and the corresponding control signal code are distributed at the same clock tick for the purpose of binding them; and the 64-bit block and the control signal code which are bound together are distributed on the same channel.

Figure 6:
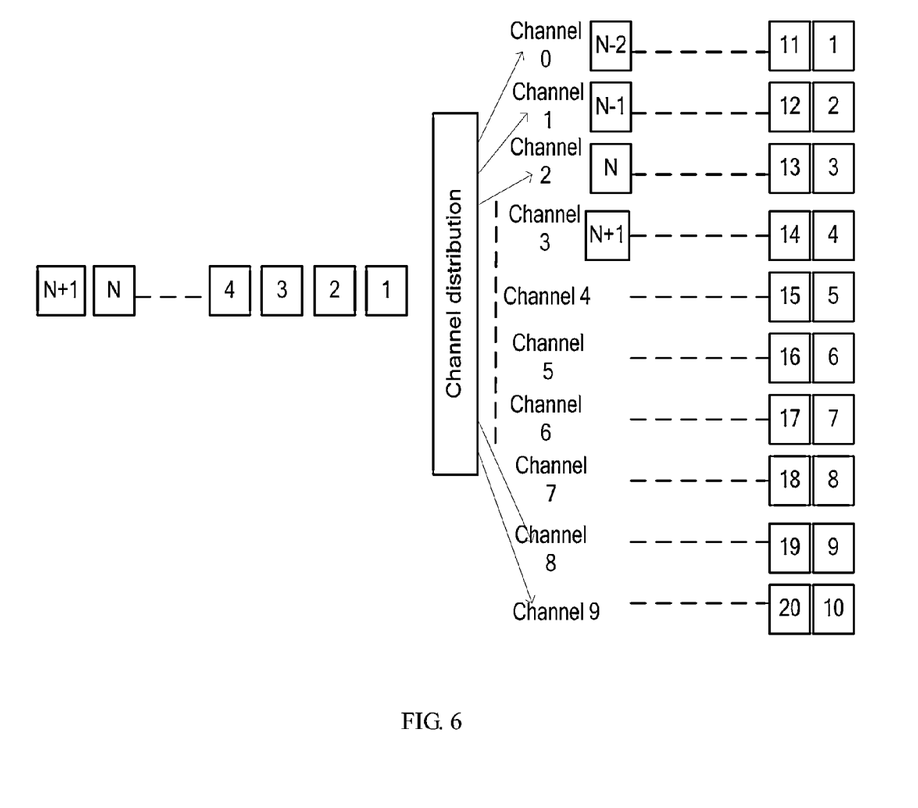
FIG. 6 shows data distribution on 10 channels in the third embodiment of the present invention.

For example, the data distribution on 10 channels is shown in FIG. 6.

Embodiment 4

Figure 7:
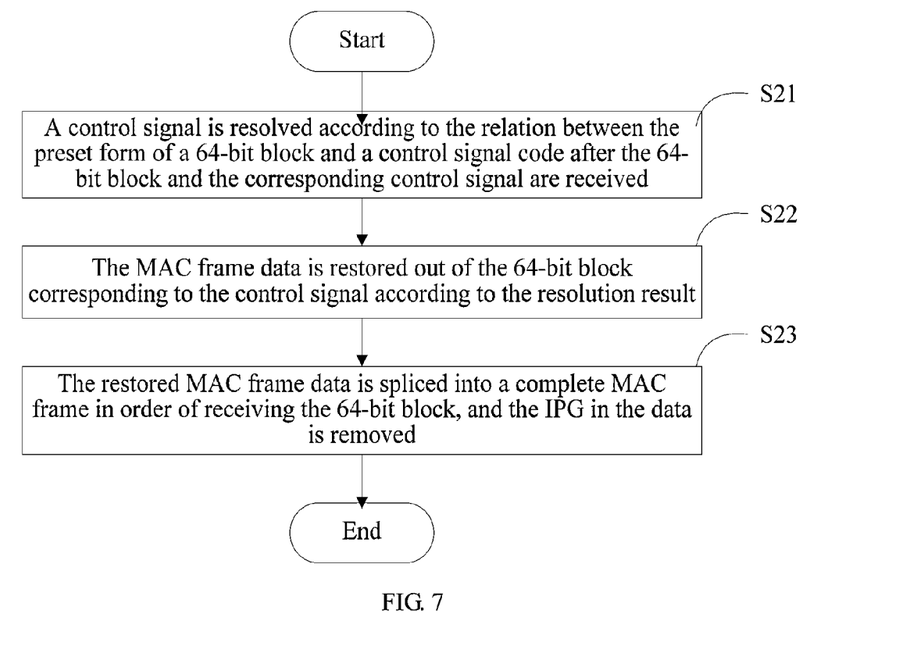
FIG. 7 is a flowchart of a method in a fourth embodiment of the present invention.

A method for receiving high-speed Ethernet MII blocks is provided. As shown in FIG. 7, the method includes the following steps:

S21. A control signal is resolved according to the relation between the preset form of a 64-bit block and a control signal code after the 64-bit block and the corresponding control signal are received.

In this step, the 64-bit block corresponds to the control signal code received at the same clock tick on the same channel.

S22. The MAC frame data is restored out of the 64-bit block corresponding to the control signal according to the resolution result.

S23: The restored MAC frame data is spliced into a complete MAC frame in the order of receiving the 64-bit block, and the IPG in the data is removed.

Figure 8:
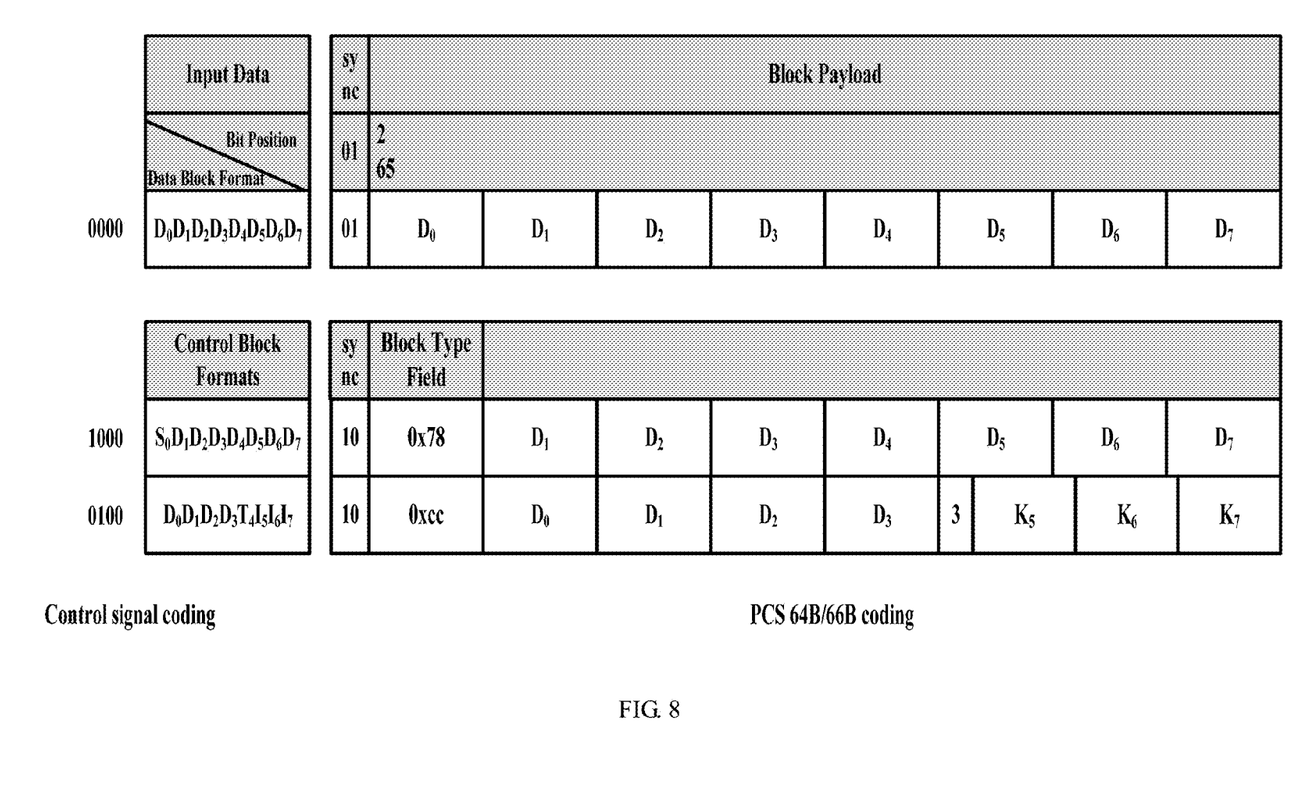
FIG. 8 shows codes in the fourth embodiment of the present invention.

In this embodiment, if every 64-bit block form corresponds to a control signal code, after the 64-bit block and the corresponding control signal code are distributed to the interface bus (on the same channel), the block may be resolved and 64B/66B coding may be performed conveniently per 64 bits after the PCS sublayer receives the 64-bit block. Taking the MAC layer data transmission in FIG. 4 as an example, after receiving the 64-bit block, the PCS resolves the control signal, and performs 64B/66B coding for the 64 block directly according to the control signal, without resolving the control character. The coding is shown in FIG. 8.

In this embodiment, if a control signal code corresponds to each instance of an octet position occupied by the first control character in a 64-bit block, the control signal code and the control character code jointly identify the 64-bit block. Each position instance includes several types of 64-bit block forms. In this case, the specific code of the control signal indicates which positions hold a control character, and the control character code helps determine the type of the control character (based on the related art), and subsequently, the format of the data or control information on the channel is identifiable. As a result, more block types are supported.

Embodiment 5

Figure 9:
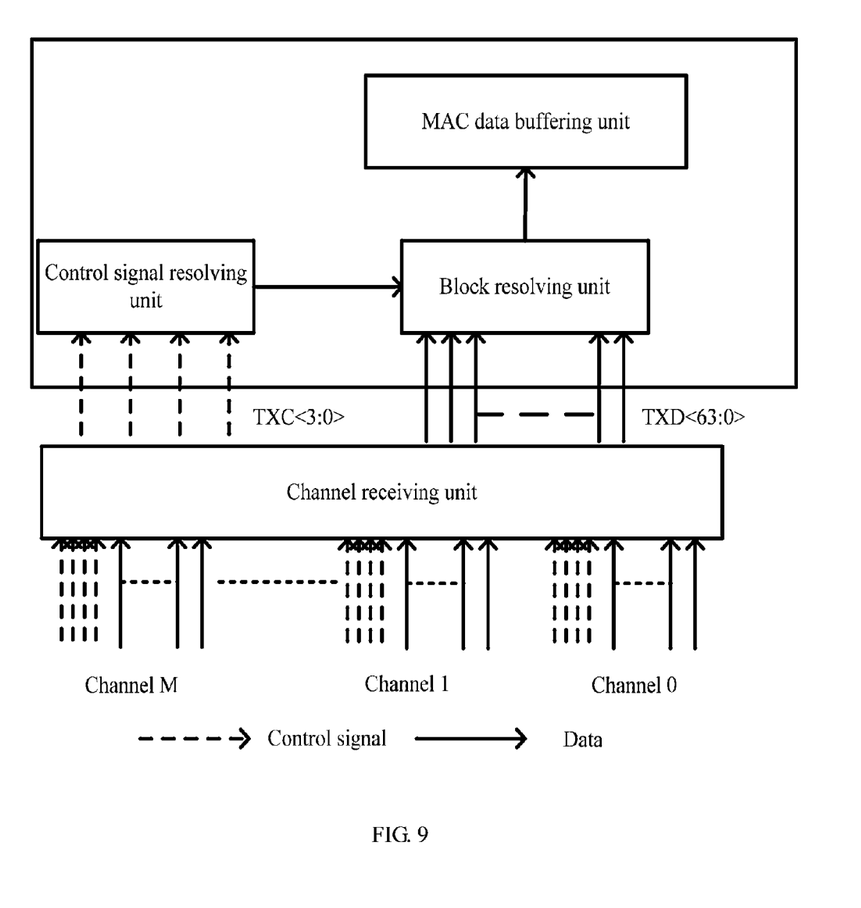
FIG. 9 shows a structure of an apparatus in a fifth embodiment of the present invention.

An apparatus for distributing high-speed Ethernet MII blocks is provided. As shown in FIG. 9, the apparatus includes a channel receiving unit, a block resolving unit, and a control signal resolving unit, and further includes a MAC data buffering unit.

The channel receiving unit is configured to send the 64-bit block and the corresponding control signal code received from the interface bus to the block resolving unit and the control signal resolving unit respectively in the receiving order.

The control signal resolving unit is configured to: resolve the received control signal according to the relation between the preset form of the 64-bit block and the control signal code, and output a resolution result to the block resolving unit.

The block resolving unit is configured to: receive the 64-bit block from the channel receiving unit, receive the resolution result from the control signal resolving unit, restore the MAC frame data out of the 64-bit block corresponding to the control signal according to the received resolution result, and splice the restored MAC frame data into a complete MAC frame in the order of receiving the 64-bit block, and remove the IPG in the data. The block resolving unit is further configured to: generate a MAC data indication signal, and send the MAC frame data exclusive of the IPG as well as the MAC data indication signal to the MAC data buffering unit.

The MAC data buffering unit is configured to receive and buffer the MAC frame data exclusive of the IPG sent by the block resolving unit according to the MAC data indication signal sent by the block resolving unit (the data may be buffered in FIFO mode).

To sum up, in the embodiments of the present invention, the blocks are distributed per 64 bits. This distribution mode increases the bit width, compresses the control information effectively, and reduces the control lines of the interface and the width occupied by the out-band control information. The distribution of the control characters is adjusted according to the preset form of the 64-bit block, and no more block forms are introduced. Therefore, the block types in the related art may be inherited in the PCS coding, and the PCS coding is simplified. The basic distribution unit is 64 bits, the data on a channel forms a 64-bit block, and the channels are independent of each other. The data at one clock tick on a channel forms a 64-bit block, and the clock cycles are independent of each other.

Further, each form of the 64-bit block corresponds to a control signal code, and the control signal code composed of only four bits (but not limited to four bits) is enough for clearly indicating whether the information carried in the 64-bit block is data and/or control information. In the decoding, data information and control information is obtained only according to the control information code, without depending on the control character code and without the need of changing the MAC frame format or encoding the control character.

Further, if a control signal code corresponds to an instance of an octet position occupied by the first control character in a 64-bit block, although the prior control character coding technology is required, the octet position occupied by the first control character in the 64-bit block is obtained only by resolving the control signal code, thus narrowing the scope drastically and improving the resolution efficiency as against the related art.

It is apparent that those skilled in the art can make various modifications and variations to the present invention without departing from the scope of the present invention. The present invention is intended to cover such modifications and variations provided that they fall in the scope of protection defined by the following claims or their equivalents.

What is claimed is:

1. A method for distributing high-speed Ethernet Media Independent Interface (MII) blocks, comprising:
   processing received Media Access Control (MAC) layer data and adjusting distribution of at least one type of control characters to generate a first 64-bit block, and adjusting distribution of at least one type of control characters to generate a second 64-bit block;
   obtaining a first control signal code corresponding to the first 64-bit block;
   obtaining a second control signal code corresponding to the second 64-bit block; and
   binding the first 64-bit block and the first control signal code together as first bound data, and sending the first bound data including the first 64-bit block and the first bound control signal code on a first channel;

wherein the first control signal code is the same as the second control signal code when an octet position of a first control character in the first 64-bit block is the same as an octet position of a first control character in the second 64-bit block, and the first control character in the first 64-bit block is different from the first control character in the second 64-bit block.

2. The method of claim 1, wherein the processing the received MAC layer data comprises: replacing a frame header of an MAC frame with a start control character and replacing a frame trailer of the MAC frame with a terminate control character.

3. The method of claim 1, wherein:
the first 64-bit block and the first control signal code are distributed at a same clock tick for binding them.

4. The method of claim 1, further comprising:
bind the second 64-bit block and second control signal code together as second bound data, and sending the second bound data including the second 64-bit block and the second control signal code on a second channel.

5. An apparatus for distributing high-speed Ethernet Media Independent Interface (MII) blocks, comprising:
a block unit, configured to process received Media Access Control (MAC) layer data and adjust distribution of at least one type of control characters to generate a first 64-bit block and adjust distribution of at least one type of control characters to generate a second 64-bit block;
a control signal generating unit, configured to obtain a first control signal code corresponding to the first 64-bit block generated by the block unit and obtain a second control signal code corresponding to the second 64-bit block generated by the block unit; and
a channel distributing unit, configured to: read the first 64-bit block in the block unit, read the first control signal code in the control signal generating unit, bind the first 64-bit block and the first control signal code together as first bound data, and send the first bound data including the first 64-bit block and the first bound control signal code on a first channel;
wherein the first control signal code is the same as the second control signal code when an octet position of a first control character in the first 64-bit block is the same as an octet position of a first control character in the second 64-bit block, and the first control character in the first 64-bit block is different from the first control character in the second 64-bit block.

6. The apparatus of claim 5, further comprising:
a MAC data buffering unit, configured to buffer an MAC frame and output the MAC frame to the block unit; and
an Idle control unit, configured to generate an Idle control character and output the Idle control character to the block unit.

7. The apparatus of claim 5, wherein the channel distributing unit further configured to: read the second 64-bit block in the block unit, read the second control signal code in the control signal generating unit, bind the second 64-bit block and the second control signal code together as second bound data, and send the second bound data including the second 64-bit block and the second control signal code on a second channel.

* * * * *